(12) United States Patent
Ferren et al.

(10) Patent No.: US 8,700,102 B2
(45) Date of Patent: Apr. 15, 2014

(54) HANDHELD ELECTRONIC DEVICE USING STATUS AWARENESS

(75) Inventors: Bran Ferren, Beverly Hills, CA (US); Lama Nachman, Santa Clara, CA (US); Kieran Del Pasqua, Portland, OR (US); Wendy March, Portland, OR (US); John Cross Neumann, Portland, OR (US); Rahul Shah, San Francisco, CA (US); Junaith A. Shahabdeen, San Jose, CA (US); Jennifer A. Healey, San Jose, CA (US); Sushmita Subramanian, San Francisco, CA (US); Giuseppe Raffa, Portland, OR (US); Alexander Essaian, San Jose, CA (US); Jonathan Huang, Pleasanton, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/539,853

(22) Filed: Jul. 2, 2012

(65) Prior Publication Data

US 2012/0270575 A1 Oct. 25, 2012

Related U.S. Application Data

(62) Division of application No. 13/376,624, filed as application No. PCT/US2010/037946 on Jun. 9, 2010.

(60) Provisional application No. 61/187,520, filed on Jun. 16, 2009.

(51) Int. Cl.
*H04M 1/00* (2006.01)
*H04M 11/00* (2006.01)
*H04M 3/42* (2006.01)
*H04W 4/00* (2009.01)

(52) U.S. Cl.
USPC ............... 455/567; 455/414.1; 455/432.2; 455/566; 379/88.14; 379/88.13

(58) Field of Classification Search
USPC ......... 455/414.1, 566, 432.2, 567; 379/88.13, 379/88.14
See application file for complete search history.

(56) References Cited

U.S. PATENT DOCUMENTS

| | | | |
|---|---|---|---|
| 6,195,571 B1 * | 2/2001 | Osuge | 340/7.58 |
| 2005/0170859 A1 | 8/2005 | Koike et al. | |

(Continued)

FOREIGN PATENT DOCUMENTS

| | | |
|---|---|---|
| CN | 1783892 | 6/2006 |
| CN | 101039485 | 9/2007 |

(Continued)

OTHER PUBLICATIONS

"PCT/US2010/037946, PCT International Search and the Written Opinion of the International Searching Authority", Mailing Date Feb. 1, 2011, 10 pages.

(Continued)

*Primary Examiner* — Opiribo Georgewill
(74) *Attorney, Agent, or Firm* — Blakely, Sokoloff, Taylor & Zafman LLP (57) ABSTRACT

Through status awareness, a handheld communications device may determine the location, activity, and/or physical or emotional state of the user. This information may in turn be used for various purposes, such as 1) determining how to alert the user of an incoming communication, 2) determining what format to use for communicating with the user, and 3) determining how to present the user's status to another person's communication device.

20 Claims, 7 Drawing Sheets

(56) References Cited

U.S. PATENT DOCUMENTS

| | | |
|---|---|---|
| 2005/0276407 A1 | 12/2005 | Mohler |
| 2006/0147002 A1* | 7/2006 | Desai et al. ............... 379/100.06 |
| 2007/0037605 A1* | 2/2007 | Logan ........................ 455/567 |
| 2008/0240387 A1 | 10/2008 | Murai |
| 2009/0170480 A1* | 7/2009 | Lee ........................... 455/414.1 |

FOREIGN PATENT DOCUMENTS

| | | |
|---|---|---|
| CN | 101193378 | 6/2008 |
| CN | 101355602 | 1/2009 |
| CN | 101378530 | 3/2009 |
| EP | 1617359 A1 * | 1/2006 |
| EP | 1 898 615 | 3/2008 |
| GB | 2444755 A * | 6/2008 |
| JP | 3243488 | 6/1999 |
| JP | 2001-119749 | 4/2001 |
| JP | 2003-229958 | 8/2003 |
| JP | 2003-299155 | 10/2003 |
| JP | 2004-328181 | 11/2004 |
| KR | 10-2006-0020337 | 3/2006 |
| KR | 10-2009-0038361 | 4/2009 |
| WO | WO-2004008651 | 1/2004 |
| WO | WO-2009-030556 | 3/2009 |

OTHER PUBLICATIONS

Hakkila, et al., "Collaboration in Context Aware Mobile Phone Applications", pp. 1-7. Proceedings of the 38th Hawaii International Conference on System Sciences—2005.

Korean Notice of Preliminary Rejection, Korean Application No. 2011-7027175, issued Dec. 14, 2012, 6 pages.

European Search Report, EP 11 19 2640 Date of Completion of the search Aug. 30, 2012.

"Japanese Patent Application No. 2011-260239", Notification of Reasons for Refusal, mailed Jul. 9, 2013., 2 pages.

1st Office Action of Chinese Application No. 201110409363.7. Mailing Date of Foreign Associate Nov. 29, 2013.

* cited by examiner

FIG. 8

HANDHELD ELECTRONIC DEVICE USING STATUS AWARENESS

CROSS-REFERENCE TO RELATED APPLICATIONS

This is a divisional application of U.S. patent application Ser. No. 13/376,624, filed on Dec. 7, 2011, which claims priority to International application PCT/US2010/037946, filed on Jun. 9, 2010, which claims priority to U.S. Non-Provisional Patent Application No. 61/187,520, filed on Jun. 16, 2009, and priority is claimed thereof.

BACKGROUND

Handheld electronic communications devices have a number of shortcoming. For instance, the method of alerting the user of an incoming communication may not be appropriate for the user's situation, and the user may forget to set it for that situation. For example, a ringing cell phone would be inappropriate in a movie theater, while a vibrating cell phone might be ineffective if it's in a purse. Further, communication may take place in several different forms (e.g., voice, text, graphics), and the preferred method may depend on the user's status at the time. Another shortcoming is that people who wish to communicate with the user have no way of knowing what the user's status is, and therefore have no way of knowing which method of communication would be best, or if communication should be delayed until another time. Conventional communications devices have no way to automatically make these choices, because they have no way of determining the relevant information.

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a computer-readable medium, which may be read and executed by one or more processors to enable performance of the operations described herein. A computer-readable medium may include any mechanism for storing information in a form readable by one or more computers. For example, a computer-readable medium may include a tangible storage medium, such as but not limited to read only memory (ROM); random access memory (RAM); magnetic disk storage media; optical storage media; a flash memory device, etc.

The term "wireless" may be used to describe circuits, devices, systems, methods, techniques, communications channels, etc., that communicate data by using modulated electromagnetic radiation through a non-solid medium. A wireless device may comprise at least one antenna, at least one radio, and at least one processor. The wireless device may also contain other components to provide various other types of functionality.

In various portions of this document, the terms 'situation', 'context', and 'status', as well as derivatives of those terms, may be used. Within this document, these terms have specific meanings. 'Situation' pertains to external conditions, that is, information gathered by the various sensors in the device, or inferred about conditions external to the device based on those sensor inputs. Sensor inputs may include information gathered through radio communication, a camera, a microphone, motion and/or orientation sensors, a light sensor, a temperature sensor, etc. Those conditions might be affected by the user's actions, but situational analysis in general does not consider the user's actions directly, only the sensed inputs indicating conditions external to the device. 'Situational awareness' involves an analysis of situation to determine factors that may be useful.

'Context' has to do with one or more of: where the user is, what the user is doing and/or is likely to do in the future, and the user's preferences. This may include considerations of what the device is doing (the mode in which the device is operating, the applications being run, etc.). Context may also consider historical factors, such as past activities, reactions, and decisions previously made under similar conditions. Because user actions may sometimes include a consideration of environmental factors, situation and context may sometimes overlap. For example, monitoring of the user's physiological state (temperature, stress level, breathing, etc.) might be considered situation (conditions external to the device) but would be also be considered context (what the user is or might be doing). 'Context awareness' involves an analysis of context to determine factors that may be useful.

The term 'status' consists of situation, context, or both. So status awareness may consist of context awareness, situational awareness, or both. In situational awareness, context awareness, and status awareness, the factors being considered may be limited to those factors that are considered relevant or potentially relevant. On the other hand, when no particular results or type of information has been specified, all factors may be considered potentially relevant, and in some embodiments the device may monitor and process many such factors on an ongoing basis, even though there is no immediate need for them.

Figure 1:
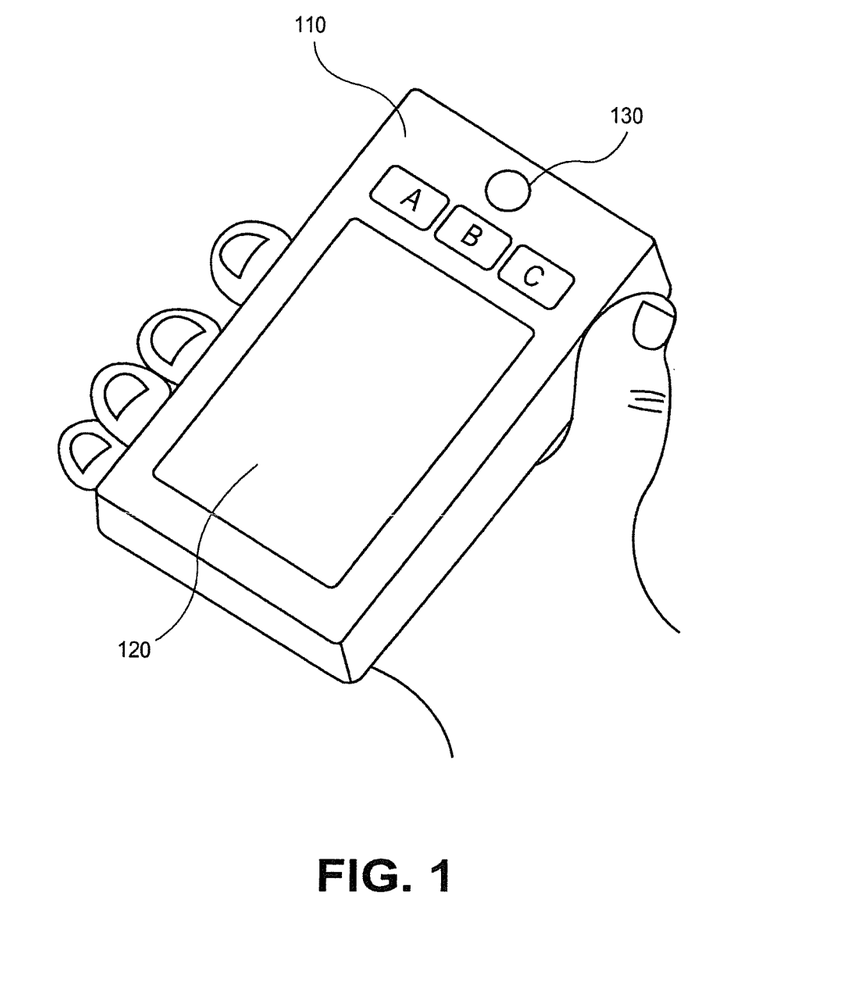
FIG. 1 shows a multi-function handheld user device for wireless communications, according to an embodiment of the invention.

FIG. 1 shows a multi-function handheld user device for wireless communications, according to an embodiment of the invention. The illustrated device 110 is shown with various components, such as a touchscreen (a touch-sensitive display screen) 120 and buttons A, B, and C. Another input/output function 130 is also shown which, depending on the embodiments, may provide various types of functionality, such as but not limited to: 1) another button, 2) a camera lens, 3) a microphone, 4) etc. Other buttons, sensors, output devices, etc. may also be included but are not shown to avoid excessive clutter in the drawing.

Although the illustrated device 110 is depicted as having a particular shape, proportion, and appearance, with buttons located in particular locations, this is for example only and the embodiments of the invention may not be limited to this particular physical configuration. For example, in some embodiments the buttons may have different sizes and/or different shapes than shown, be located elsewhere on the same side or on different sides of the device, etc. They may also come in different colors. In some embodiments the overall shape of the device 110 may be different than shown. Device 110 may also include functionality for wireless communication, for various visual, audio, and physical inputs, and for various visual, audio, and physical outputs.

Status Analysis and Awareness

Much may be inferred about the user based on context awareness. For example, if the device is performing an interactive operation that requires the user's involvement (e.g., entering text, choosing a menu selection, taking pictures, scrolling through stored pictures, etc.) it may be assumed the user is co-located with the device and is participating in that operation. If the device is transmitting and receiving voice communications over a wireless interface, it may be assumed the user is engaged in a wireless voice communication, using the device as a phone. Many such activities that require the user's action imply that the user is holding the device, and can be immediately contacted through the device.

Other contextual activities may imply the user's presence and involvement, but with a lesser degree of confidence. For example, if the device is playing music or video, it may be assumed the user is probably listening or watching, but sometimes the user may step away from the device for a few minutes without pausing or shutting off the music or video. If the user transmitted an email a couple of minutes ago, the user is probably still in possession of the device, but might have set it down and walked away. If the user has had no interaction with the device for a long time, then context awareness may provide little evidence of what the user is doing. The longer the period of time that elapses without a direct user input (press a button, touch the touchscreen, speak into the microphone, etc.) the less likely it is that the user is still involved with the same operation, and the less likely it is that the user is still co-located with the device.

Internal time and scheduling operations may also provide context information. For example, a scheduling program combined with the current time/day/month/year from the device's internal clock and calendar may indicate the user should be at a particular place and engaged in a particular action. Of course, this alone does not indicate that the user is actually following his schedule, and more information might be desirable for corroboration.

Situational awareness may be more complicated than context awareness, as the effects of the environment on the user may be more ambiguous. The device may have a number of sensors that permit it to determine what is going on external to the device. These sensors may include but are not limited to things such as: 1) a microphone for audio inputs, 2) a camera to take pictures and/or video, 3) accelerometers or other location/movement sensors that can provide information on orientation, movement, and/or location, 4) a temperature sensor to measure temperature directly or indirectly, and 5) wireless communications, which can access vast amounts of information.

Each type of sensor may be directed to monitor the environment under various conditions, such as but not limited to: 1) when directly triggered by the user (e.g., when the user takes a picture), 2) when indirectly triggered by the user (e.g., when the user starts another operation that in turn causes the sensor to begin operating), 3) when triggered by the expiration of a timer, 4) at scheduled times/dates, 5) when triggered by another program, possibly based on inputs received from other sensors, 6) etc. Some sensors may operate full time, assuming their power consumption is not too great.

The inputs from each sensor may be processed in various ways to produce useful information, and the type of processing may depend on what type of useful information is being sought. For example, audio inputs may be processed to identify things such as but not limited to: 1) the words being spoken, 2) the identity of the person speaking, 3) identifiable background sounds, such as traffic noise, the murmur of a crowd, the tinkling of silverware in a restaurant, the roar of a jet engine, etc., 4) music, 5) sounds of nature, such as birds singing, flowing water, etc. Similarly, visual inputs from the camera may be processed to identify things such as but not limited to: 1) a person, 2) the identity of the person (e.g., through facial recognition), 3) a type of business (e.g., from a well-known logo on the building), 4) whether objects in the image are moving, 5) the ambient light level, 6) colors, 7) whether the device is in a city (e.g., tall buildings close together), a forest (e.g., tall trees close together), a suburban neighborhood (e.g., houses close together), a bus (e.g., rows of seats close together in a small space), a sports stadium (e.g., thousands of seats arranged around an open space), 8) etc.

Inputs from three accelerometers configured in a mutually perpendicular arrangement may be used to measure things such as but not limited to: 1) orientation of the device (e.g., by determining the component of gravity sensed by each one), 2) acceleration along all three axes, which may be converted to velocity in three dimensions, which may in turn be converted to positional change in three dimensions, 3) repetitive up-and-down motion, which may imply walking or jogging, 4) etc.

Temperature may be analyzed to derive various types of information. Ambient air temperature may provided by a direct temperature sensor. However, it might be fooled by warmth from the user's hand when the device is being held. An infrared sensor may provide less ambiguous information, when directed towards a particular object. If the camera has an infrared filter or sensor array, the resulting pictures may be analyzed to determine the relative temperature differences of different objects in the picture, and could conceivably be used to convert the camera into a night-vision infrared viewer.

Radio may be one of the most useful and versatile sensors on the device. Many types of devices communicate through radio signals, and the information in those signals may provide a great deal of information about user's surroundings. Incoming GPS signals, when analyzed by the device's GPS system, may pinpoint the device's location on earth within a very small area. Signals from an access point (AP), base station (BS), or wireless router indicate the device is within a known range of that AP/BS/router, which may in turn indicate the user is at work, at home, at a local coffee shop, etc. The distinctive radio emissions from a microwave oven may identify the location as a kitchen. Nearby RFID tags may also be detected through radio, and knowing the object to which an RFID tag is attached may provide useful information. In addition, some RFID tags may be connected to their own sensors, and may transmit that sensor information to the device (e.g., temperature, humidity, light levels, etc.). For very broad location information, when more precise information is not available, the reception of commercial broadcast signals (e.g., television, AM radio, FM radio) may indicate location within a particular region. Reception of several such signals may permit triangulation, to reduce the size of the possible location area. If the location of the broadcast towers is not known, the content of the broadcast information (e.g., the language, the cities being mentioned, etc.) may help.

Radio communication may also be used to expand the databases that the device has access to. By using wireless access to the Internet, the device may obtain maps, directions, street addresses, aerial photographs, types of establishments, etc. that are associated with the device's location.

Both context and situational awareness may be combined in various ways to analyze the user's location and activity, and even to anticipate the user's needs. This anticipation may result in the device obtaining information that was not directly requested by the user, but which the user might find useful. For example, if the user is requesting a list of movie theaters in his area, the device may also obtain a list of the movies being shown at each, and their starting times, in anticipation that the user will subsequently be able to use that information.

The device may also use historical data to analyze the user's status. If a particular group of inputs in the past indicated a particular status condition for the user, those same inputs now may indicate the user probably has the same status. This historical data may be used to help determine current location, activity, and anticipated needs.

Figure 2:
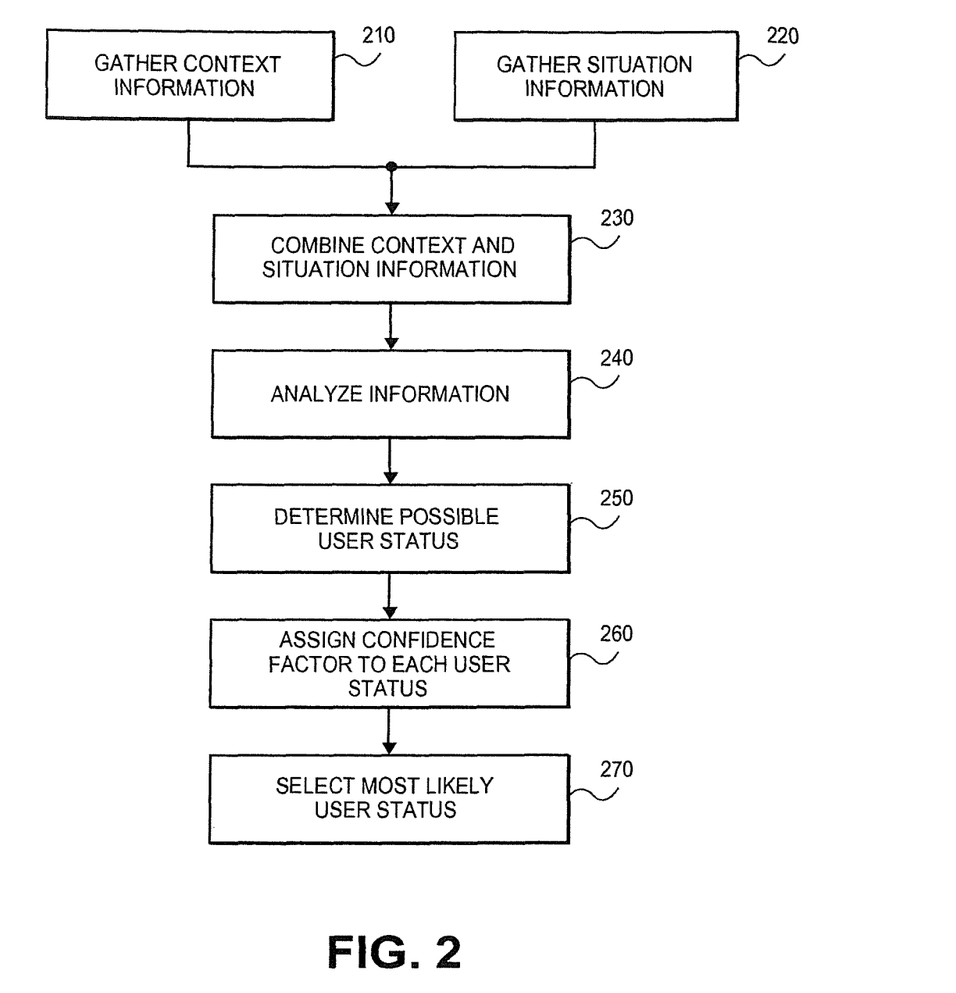
FIG. 2 shows a flow diagram of a method of performing status awareness, according to an embodiment of the invention.

FIG. 2 shows a flow diagram of a method of performing status awareness, according to an embodiment of the invention. In the illustrated embodiment, at 210 the device gathers context information, while at 220 the device gathers situation information. Examples of these two types of information, and examples of the techniques for gathering them, have been discussed in some of the previous paragraphs. The operations of 210 and 220 may each be performed according to various schedules: 1) continuously, 2) periodically, 3) when requested, 4) when specific information is needed, etc. In one embodiment, some types of information may be gathered on an ongoing basis, while other information will be gathered only when it is deemed to be useful.

Since status awareness depends on both context and situation information, these two types of information may be combined at 230 and jointly analyzed at 240. Based on the results of the analysis, which may include some probability analysis, at 250 the device may determine one or more status conditions that are possible and even probable for the device's user. Again using probability analysis, a confidence factor may be assigned to each of these status conditions, and at 270 the status condition with the largest confidence factor may be selected. In some embodiments, if none of the status conditions have a confidence factor that exceeds a particular threshold value, then none of them will be selected.

Status-Based Alerting Techniques

When a device receives an incoming communication, it may have several different techniques for notifying the user of that incoming communication. In some embodiments, a device may automatically choose from among those multiple techniques for alerting the user, based on the perceived status of the user. These alerting techniques may include any feasible alerting technique, such as but not limited to: 1) the device may produce an audible alert (e.g., several different types of rings or other sounds may be used to give the user more information about the incoming communication), 2) the device may produce a spoken voice through the device's speaker or through headphones, 3) the device may vibrate, 4) one or more displays on the device may light up, flash, etc., 5) the display on the device may provide a visual alert, 6) the device may wirelessly transmit the alert to another device, essentially instructing that other device to alert the user through a means that is available to that other device (for example, a video alert on the screen of a nearby television). Of course, any combination of these and/or other techniques may be used.

In addition, if the user does not respond to the alert within a predetermined time, the alert may become more noticeable in some way, such as but not limited to: 1) increased sound volume and/or the frequency of that sound, 2) increased urgency in a spoken voice or ringing sound, 3) brighter display, 4) different color of light, 5) more rapid occurrence of a flashing light or periodic sound, 6) etc. In some embodiments, the particular alerting technique may change, or multiple alerting techniques may be combined, in an effort to get the user to notice and respond.

Whichever alerting techniques are available to the device, the device may choose from among multiple ones of those techniques based on the user's status, as determined through status awareness. For example, some activities indicate the user is interacting with the device in some manner and can be notified in that same manner. If the device is playing music through connected headphones, it may assume the user might not be looking at the screen and might not be able to hear an external ring with the headphones on, so it may present the alert as an audible signal through the headphones. Conversely, if a video is playing on the device's screen, or if the user is entering data through the touchscreen, it may present a video alert on that touchscreen. If the device is using a remote system for output (e.g., a television or music system), the device may use that system to generate the alert. These and many other status-based considerations may be used by the device to automatically select from among the possible alerting techniques.

Status awareness may be considered when determining which alerting technique to use. These are some examples:

i. Device Location—If the device determines it is in a restaurant or theater, it may vibrate or ring softly. If in the user's home, it may ring at full volume. If the device is in an area that enforces restrictions on such devices (e.g., prohibits all audible alerts) it may use only those techniques that are permitted.

ii. Ambient Noise Levels—If the device senses it's in a quiet environment, it may vibrate or ring softly. If it's in a noisy environment, it may ring at a volume proportional to the noise level.

iii. Time of Day—The device may vibrate during the day when it's typically being worn on the user's belt, and ring at night when it's typically resting on a night stand.

iv. User Presence—If the device determines it's in contact with the user, based on temperature, motion, and/or an RFID tag the user wears, it may vibrate. If it cannot detect the user's immediate presence, it may ring.

v. Device Activity—If the device senses the user is reading something on the touchscreen (because the user changes the display frequently), it may alert the user by providing a visual alert on the screen. If it senses the user is listening to music through the device, it may override the music with an audible alert.

vi. Calendared Priorities—When the user schedules his activities on the device's calendar, the activities may be classified as to priority, with each priority implying a different preference in alerting techniques. During the time of the scheduled event, the device may use the alerting technique associated with that priority. For example, one level of priority (e.g., for important business meetings, religious services, etc.) may indicate that no alerts will be issued, and the user will have to check for missed communications after the event. Another level of priority (e.g., for less important business meetings, anniversary dinner with spouse, etc.) may use an urgent alert for calls from certain people (boss, doctor, child, baby sitter), but use a softer alert or no alert for other incoming communications. Still another level of priority may place no restrictions on the alerts.

The user may manually change the automatically selected alerting technique after the alert has begun. The device may keep track of such changes over time, and select the user's preference for future alerts issued under similar circumstances.

Figure 3:
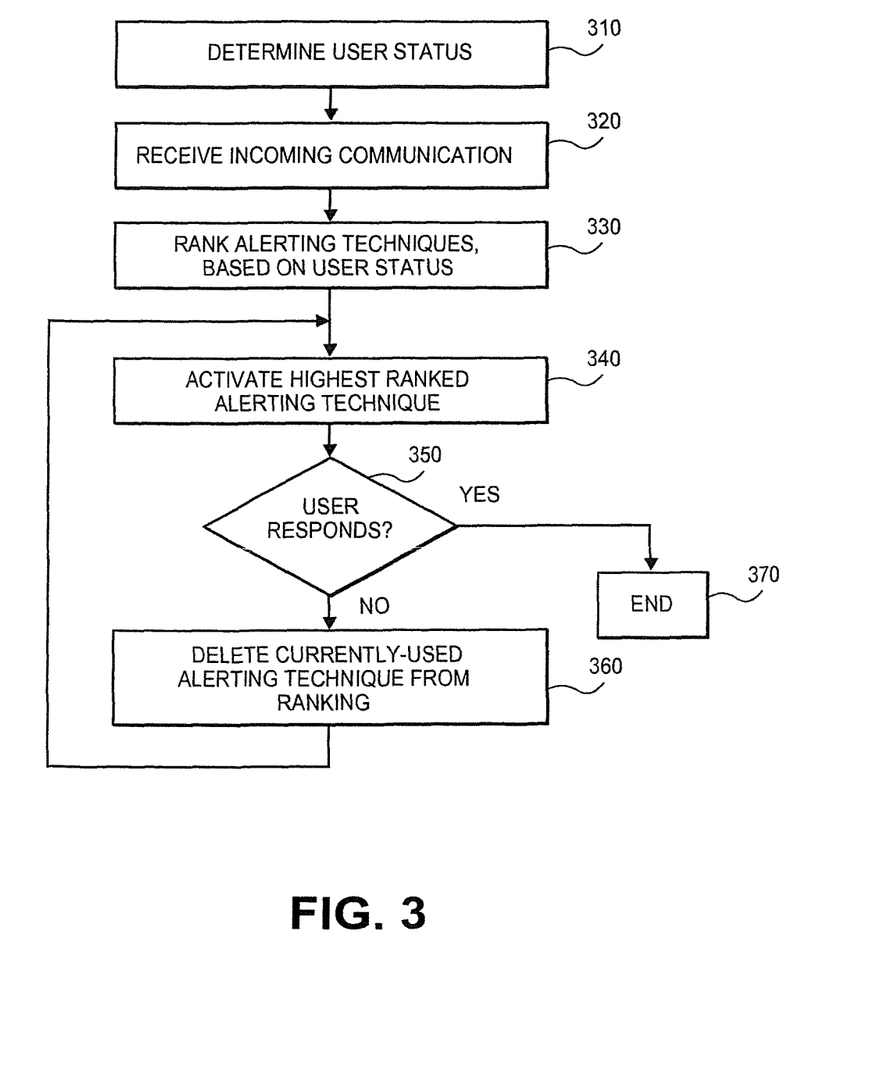
FIG. 3 shows a flow diagram of a method of alerting a user of an incoming communication, according to an embodiment of the invention.

FIG. 3 shows a flow diagram of a method of alerting a user of an incoming communication in a manner based on status awareness, according to an embodiment of the invention. In the illustrated embodiment, at 310 the device may determine the user's probable status (for example, by following the method of FIG. 2). When an incoming communication is received by the device at 320, it may examine the various techniques available to it for alerting the user of the incoming communication, and at 330 it may rank the acceptable ones from most desirable to least desirable, based on the user's status. This process may be performed in various ways, for example by following the techniques described in the previous paragraphs.

Based on this analysis, the device may use the highest ranked (most desirable) technique to alert the user of the incoming communication at 340. If the user responds within a predefined time limit (e.g., by accepting or proactively rejecting the communication as determined at 350), this process may end at 370. But if the user does not respond, as determined at 350, the current alerting technique may be abandoned and the next highest ranking alerting technique may be tried. This may be a different alerting technique (e.g., a flashing light instead of an audible ring), or a more urgent version of the same alerting technique (e.g., a louder ring), or a combination of alerting techniques. The device may work its way through the alerting techniques in this manner until the user responds, or until the ranked techniques have been exhausted.

The flow diagram shows the current alerting technique being deleted from the ranking list at 360, so that the next highest ranking technique will become the highest ranking technique at 340. But this is just one of many detailed processes that may be used to progressively try the ranked alerting techniques. In some embodiments, the user may be able to override the current rankings by redefining them. In some embodiments, this override may be temporary (e.g., for a predetermined time) or permanent (e.g., until changed again by the user).

Communication Format Adaptive to Recipient Status

Whenever a user receives an incoming communication on a communications device, the ability or willingness of the user to accept that communication may depend on the user's status. It may also depend on the format of the communication. For example, a user in a meeting may be willing to accept a text message but not a voice call, while a user that is driving a car may be willing to receive an email but unwilling to accept an interactive communication such as a text message or voice call. In addition, if the user is not able or willing to accept a particular incoming communication in its current form, he may have a preference as to whether to notify the sender about alternatives. All of these things may depend on the user's status at the time the communication is received.

For the purposes of this document, the term 'format' indicates whether the communication is presented as: 1) interactive audio (e.g., voice), 2) interactive text (e.g., a text message), 3) participatory graphics (e.g., the user must look at the screen), or 4) non-interactive text, voice, and/or graphics (e.g., email, voicemail, and/or stored graphics). In some embodiments, these major formats may be further subdivided into more specific formats, with different rules for handling each one. In addition, in some embodiments multiple formats may be combined in a single communication (e.g., interactive voice with non-interactive graphics). In such a case, the communication may be categorized as one format for handling purposes, or each portion of the communication may be treated separately for handling.

As previously described, the user's status may be monitored by the device through both context awareness and situation awareness. However, in this case the object of this monitoring is to decide what to do with an incoming communication rather than decide how to alert the user about that communication, so the factors that are considered may be different, and the factors may be considered in different ways.

When an incoming communication is received, the device may do several things, such as but not limited to: 1) decide whether to alert the user immediately, at a later time, or not at all, 2) convert the communication to a different format (e.g., convert interactive text to voice, voice to interactive text, voice to email, email to voice, etc.) for presentation to the user, 3) transmit a response to the sender, notifying the sender that the user is currently unavailable for communications in this format, and possibly suggesting a different format that the user will accept at this time and/or informing the sender when the user will probably be accepting a communication in its current form. Various actions may also be combined, such as converting a voice message to an email, informing the sender that the user will be available for voice communication at a particular time, and alerting the user to these actions when the user's status permits such an alert.

In addition to the format of the communication, the priority of the communication may be considered when deciding how to handle it. An 'external priority' may be assigned to a communication without regard to the user's status, while an 'internal priority' may be assigned based on the user's status. Both may be factors in deciding how the communication is handled.

For external priorities, if the sender is aware of the priority scheme, any of various priority levels may be pre-coded into a communication before it is transmitted to the user's device. Alternatively, the user's device may decide which external priority should be assigned after receiving the communication. This decision may be based on various criteria, such as but not limited to: 1) the priority may depend on who the sender is (e.g., the user's boss or the user's spouse may be assigned top priority, while a communication from an unknown sender may be assigned a low priority), 2) the communication may be searched for key words which will trigger a certain priority level (e.g., the words "cancelling your contract" might trigger a high priority), 3) whether there has been a recent history of communications with the sender, 4) the length of the communication (a long communication might be assigned a lower priority because it will require more of the user's time), 5) etc.

Internal priorities may depend on the user's status at the time the communication is received. This status may in turn depend on a combination of context and situation factors that may be considered when determining how to handle the incoming communication. These are some examples:

i. Location and Time of Day—Many users have routines that may be programmed into a device or learned by the device over time. For example, a user may want to receive only high-priority messages during working hours or while in the office. Further, if a scheduling program shows the user in a meeting, all incoming communications may be dropped to a lower internal priority. At other times, various sensors may show the user is traveling between home and work and is free to receive messages (if the user rides public transportation), or doesn't want to receive messages (if the user drives himself).

ii. Activity—A device's accelerometers may be able to detect whether the user is vertical, horizontal, motionless, moving slowly or rapidly, changing in speed/direction, etc. These factors may be analyzed to determine if the user is most likely lying down, sitting, standing, walking, running, or engaged in vigorous physical activity such as playing tennis. This may in turn be combined with other sensor information, such as GPS coordinates, to determine if the user is commuting to/from work, sitting at home or work, exercising, reading a book in a library, etc.

iii. Background sounds—The device may monitor background sounds to analyze the user's current status. For example, a moving car or bus may produce identifiable road noise, and the surrounding traffic sounds may also be identifiable. The sounds of clattering plates, tinkling silverware, and the occasional use of the words 'menu' and 'refill' may indicate a restaurant. When such things are combined with GPS coordinates, the user's location and activity may sometimes be identified with high confidence.

iv. Device detached from the user—If the device is completely motionless for an extended period of time, it may indicate the user is not wearing or carrying it. The device may then try to contact an alternative communications system that the user has previously specified, based on the device's current location. For instance, if the user is at work the device may try to send a voice-version of the message to the user's office telephone. If the device is near the user's home PC, it may transmit an email version of the message to that PC. Or the device may simply return a message to the sender that the user is away from his primary communications device at this time.

Figure 4:
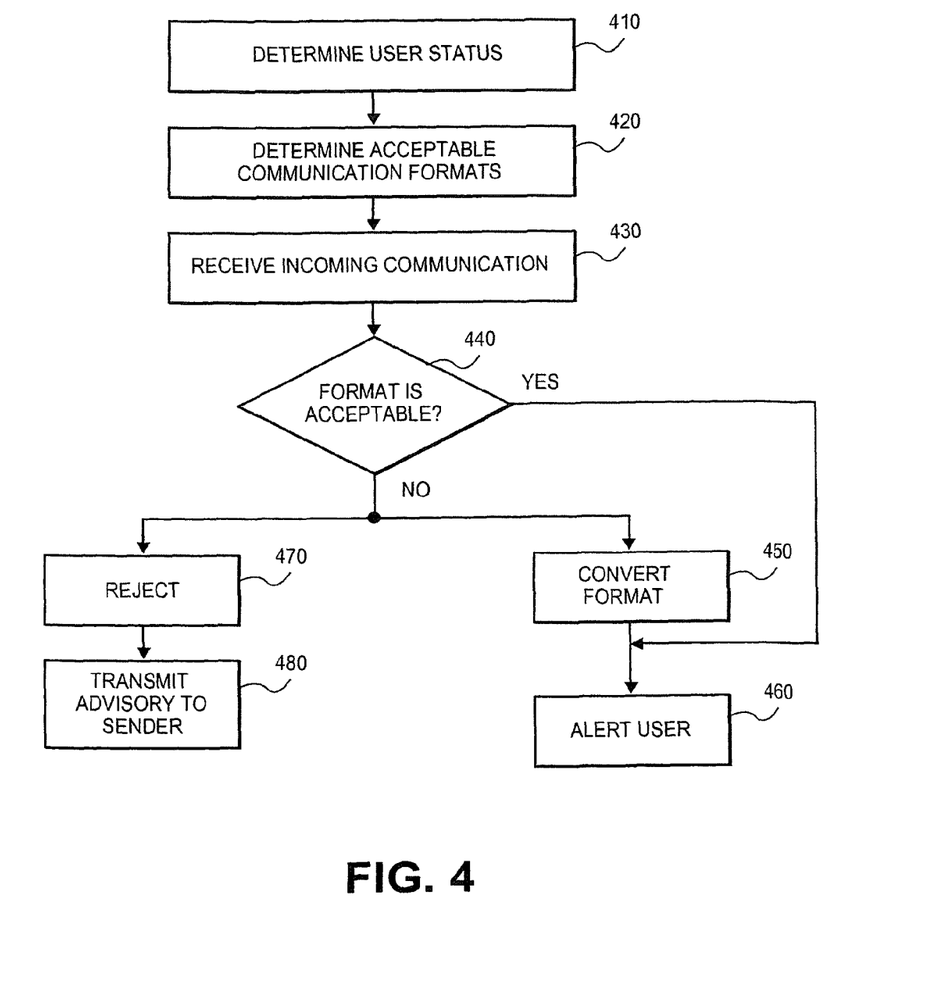
FIG. 4 shows a flow diagram of a method of adapting the format of an incoming communication, according to an embodiment of the invention.

FIG. 4 shows a flow diagram of a method of adapting the format of an incoming communication, according to an embodiment of the invention. In the illustrated embodiment, at 410 the device may determine the user's probable status (for example, by following the method of FIG. 2). Based on that information, at 420 the device may determine which communication formats will be acceptable for the user to receive in his current status. When a communication is received at 430, the device may determine at 440 if the format of that communication is one of the acceptable formats. If it is, the device may alert the user of the incoming communication at 460.

If the format of the incoming communication is not one of the acceptable formats, as determined at 440, the device may have multiple choices of what to do next. One choice is to convert the communication to an acceptable format at 450, and then alert the user of it's presence at 460. For example, if a voice call is received but the user is not accepting any interactive communications, the device may use a voice-to-text conversion program to convert the voice message to text, store that text in a file, and then alert the user that a stored text message was just received.

Alternately, the device may simply reject the incoming communication in its present format at 470, and transmit a message to the sender at 480 that the message was not accepted. In some embodiments, this message may be in the same format as the received communication (e.g., voice for a voice call, text for a text message, etc.). In some embodiments, this message may suggest an alternate format that the sender can use that will be accepted by the user.

Graphical Depiction of User Status

The status of the device's user may be conveyed to at least one other person, in response to various stimuli, by wirelessly communicating that information in a suitable format to the wireless device being operated by the other person. For example, in some embodiments this communication may be presented in a graphical format that conveys information about the user's status. In some embodiments this may be a graphically-generated avatar, indicating the location, activity, situation, devices in use, etc., that convey the user's status to another person. In various embodiments, the avatar may be animated or static. Some examples may include, but are not limited to: 1) a figure walking, running, sitting, standing, riding a bike, or riding in an automobile, may indicate the user is performing that action, 2) the figure's clothing (e.g., heavy coat or light T-shirt) may indicate the temperature the user is experiencing, 3) a picture of the user holding a communications device next to his ear may indicate the user is involved in a voice call, 4) a picture of a figure in bed with his eyes closed may indicate the user is asleep, 5) etc.

Other types of visual presentation may be used. Some examples may include, but are not limited to: 1) a picture of dark clouds or lightning may indicate the user is outdoors and experiencing foul weather, 2) a picture taken with the device's camera may show the user's surroundings, 3) a depiction of a restaurant, library, athletic stadium, etc., may indicate the user is at that type of establishment, 4) a topographical map or aerial photograph (available online) may show the user's location, 5) etc. Text information may also be included (such as an address and/or the name of the building or town) to provide more detail.

The graphical depictions that are used (e.g., an avatar of the user, pictures of various surroundings, etc.) may come from various sources, such as but not limited to: 1) a catalogue of depictions that were provided with the device and/or downloaded to the device, 2) graphics that are generated by the device, 3) custom depictions that are created by the user, 4) etc. In some embodiments, the user may select which depictions will be available for use. A selection process may be used to reduce all the available choices down to the few choices the user has approved for use.

Figure 5:
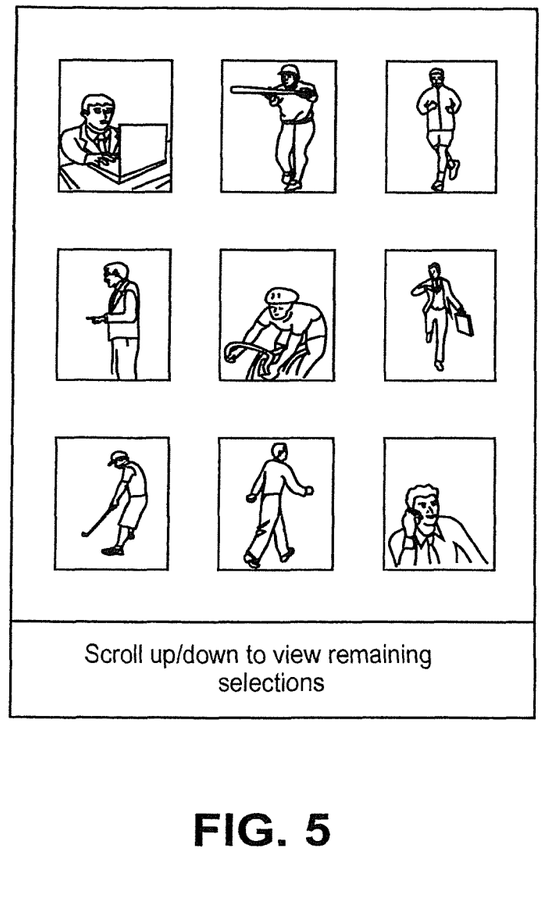
FIG. 5 shows a matrix of selections presented on the device's display, according to an embodiment of the invention.

FIG. 5 shows a matrix of selections presented on the device's display, according to an embodiment of the invention. In this example, the user may select which of the available choices he wishes the device to choose from when the device is choosing how to show the user's status. Instructions for making the selection may be in a separate area, shown here at the bottom of the device's display. A scrolling mechanism may be used to allow the user to scroll through the available choices. In some embodiments, different groups of selections may be defined by the user, and the group that is available at a particular time may depend on various factors, such as but not limited to the identify of the caller or requestor. In some embodiments, the currently active group may be manually chosen by the user.

This graphical presentation may be transmitted in response to various triggers, such as but not limited to: 1) it may be sent at a pre-determined time, based on an internal clock, 2) it may be sent at predetermined intervals, based on expiration of a timer, 3) it's transmission may be manually triggered by the user, 4) it may be sent when the user's condition changes according to certain predetermined criteria, 5) it may be sent to a caller in response to the user not answering the call, 6) it may be sent in response to a caller requesting it, 7) etc.

The choice of intended recipient(s) for this information may depend on various factors, such as but not limited to: 1) the recipient(s) may be manually chosen by the user or other authorized person (e.g., a person traveling alone may want to periodically transmit their status information to a close relative), 2) such information may be requested by various people that wish to receive it (on a one-time basis or an ongoing basis), provided they have been previously authorized by the user, 3) the list of recipients may be based on the frequency of recent communications with those recipients, 4) the list of recipients may vary automatically based on such things as the time of day, location of the user, activities of the user, a pre-programmed schedule, etc., 5) anyone that communicates with the user's device may be deemed an authorized recipient, 6) etc.

In another embodiment, FIG. 5 may depict the display of a device that is receiving information on the situations of multiple other people. In this instance, each picture in the display may represent the status of a separate person, each of whom has a separate device capable of transmitting a message depicting the status of that particular person. As these status reports are received from these multiple other devices, the current device can collect them for simultaneous display. In some embodiments, the device will transmit a request for this status information only when the user needs it. In other embodiments, the device may proactively request such status automatically, and save the information in case the user needs it. FIG. 5 shows one configuration for such a display, but other configurations may be used instead. In some embodiments, the user may specify the one or more people whose status is to be displayed, but in other embodiments the device may automatically make that choice, based on suitable criteria that has been previously gathered or derived.

Figure 6:
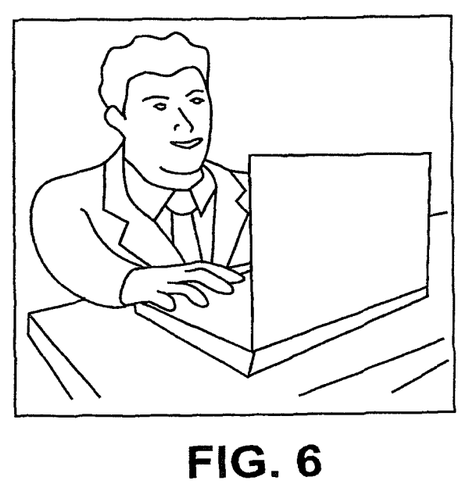
FIGS. 6 and 7 show examples of a graphical depiction of a user's status, according to an embodiment of the invention.
Figure 7:
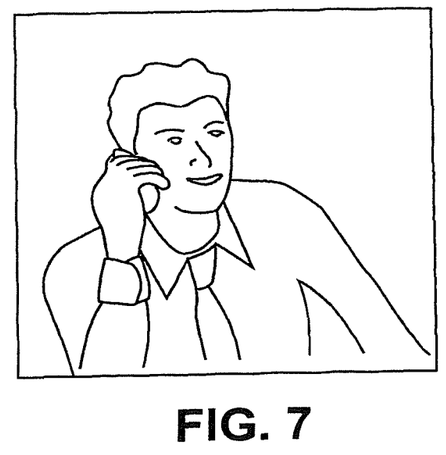

FIGS. 6 and 7 show examples of a graphical depiction of a user's status, according to an embodiment of the invention. FIG. 6 shows the user operating a computer. FIG. 7 shows a user talking on a phone. In some embodiments, different depictions may be combined for the presentation. For example, a depiction of the user riding in a vehicle with the device against his ear, sitting next to an avatar of another person with their hands on a steering wheel, may indicate the user is talking on his phone while riding as a passenger in a car that another person is driving.

In some embodiments, the graphical depiction may be retrieved or constructed as a single-layered image. In other embodiments, the depiction may be constructed from multiple layers. For example, the lower layer may depict the background scenery, the next layer above it may depict a building sitting in that background, the next layer may depict various types of people around that building, the next layer may depict the user's avatar in front of those people, and the topmost layer may show the user's clothing and/or accessories.

When the recipient of such information receives this graphical representation, that recipient then has more information on which to base various decisions, such as but not limited to: 1) whether to try to contact the user, 2) what method to use when contacting the user, 3) whether to contact police if foul play is suspected, 4) etc.

In addition to depicting the user's location and/or activity, some presentations may depict the user's emotional state and/or physical state. Voice analysis may be used to determine the user is happy, tired, sleepy, angry, hysterical, etc. The sound of snoring, combined with a lack of motion, may indicate the user is asleep. Other such inputs may be used to determine other emotional states and physical states. In some embodiments, the user may select an emotional or physical state that he wishes to be depicted, regardless of what the sensors indicate.

In addition to the above factors, the determination of the user's status may be influenced by past activities and/or known preferences. For example, up-and-down motion combined with a certain range of horizontal speeds might be interpreted as horseback riding (if the user is an avid equestrian), mountain biking (if the user is an avid cyclist), or jogging (if the user is an avid runner).

Although the previous descriptions have all related to presenting the user's status with a graphics image, in some embodiments the information may be presented either in text form or through an audible presentation. This allows the user status to be presented when the requestor's device doesn't have the capability for a graphics display, or when the requestor has selected a non-graphics mode of presentation (e.g., when the requestor is driving a car and doesn't want to be distracted by a visual presentation).

Regardless of the sources of information that are used, some of the final decisions about the user's status may be based on assumptions. A confidence factor may be assigned to each assumption, to certain combinations of assumptions, and/or to the final result. In some embodiments, the result must have a confidence factor that is higher than a pre-defined threshold before the associated graphical depiction will be transmitted. In some embodiments, multiple possible results may be determined, and the one with the highest confidence factor will be selected for transmission. In some other embodiments, multiple presentations will be transmitted, with each showing a different possible status that has a high confidence factor.

Figure 8:
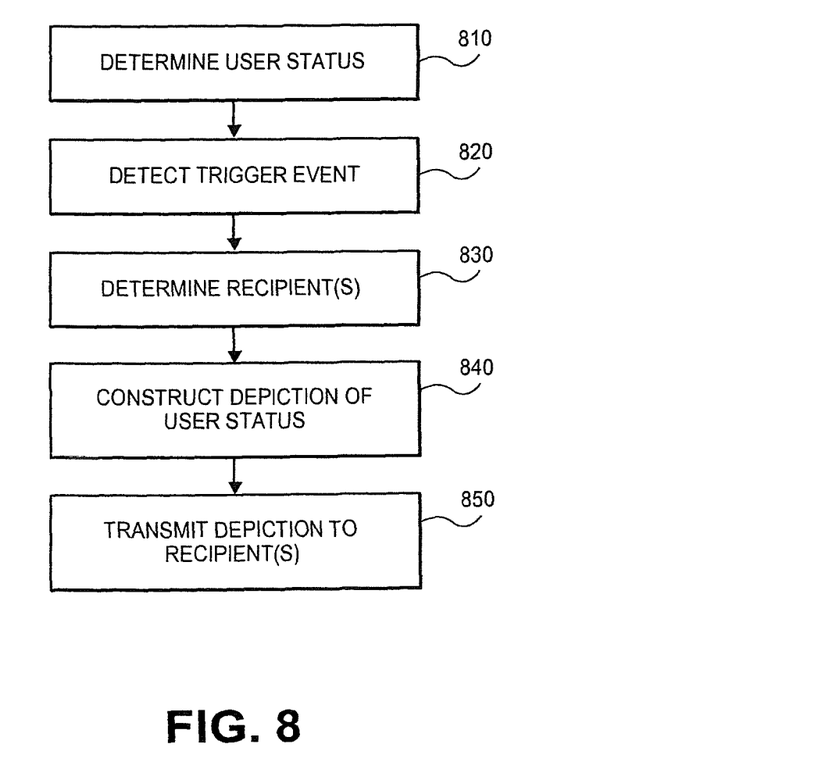
FIG. 8 shows a flow diagram of a method of notifying another person of the user's status, according to an embodiment of the invention.

FIG. 8 shows a flow diagram of a method of notifying another person of the user's status, according to an embodiment of the invention. In the illustrated embodiment, at 810 the device may determine the user's probable status (for example, by following the method of FIG. 2). The device may then wait until a triggering event is detected at 820. A triggering event is an event that triggers the device to transmit the user's status to another person or device. After determining the recipient(s) that are to receive this information at 830, the device may construct or select a graphical depiction of the user's status at 840. And at 850 the depiction may be transmitted to the recipient.

The format of the depiction may be based, at least partly, on the presentation capabilities of the recipient device, if that information is known. In some embodiments, the recipient may announce its capabilities, or request a preferred format, before the depiction is sent. If there are multiple recipients, the device may construct the depiction in multiple formats, each destined for a different recipient or group of recipients.

The foregoing description is intended to be illustrative and not limiting. Variations will occur to those of skill in the art. Those variations are intended to be included in the various embodiments of the invention, which are limited only by the scope of the following claims.

What is claimed is:

1. An apparatus, comprising:
a handheld wireless communication device having a touchscreen, a processor, a memory, and a radio with a receiver and a transmitter, the device to:
receive an incoming communication through the radio;
monitor context awareness and situation awareness relating to a user of the device, wherein the situation awareness pertains to conditions external to the electronic device as determined from sensor inputs provided by one or more sensors of the electronic device, wherein the sensor inputs are based on information relating to the external conditions gathered by the one or more sensors; and
automatically select, based on at least one of the context awareness and the situation awareness, a format in which to present the communication to the user of the device, wherein the context awareness is based on user contexts including the user's preferences, the user's historical activities, the user's current activities, and the user's speculative activities, wherein the activities include one or more of actions, reactions, and decisions associated with the user, wherein automatic selection is performed based on at least one of
external priorities being assigned to the incoming communication without regard for the status awareness of the user,
internal priorities based on the status awareness at a time when the communication is received, and
probable status of the user based on a confidence factor assigned to the probable status and as compared to a confidence threshold value.

2. The apparatus of claim 1, wherein the internal priorities are determined based on the combination of the one or more context factors and the one or more situation factors, wherein the combination includes at least one of the user's location at a particular time of day, the particular time of day, the user's activities, background sounds, and movement of the device or its proximity to the user when the device is with the user or when the device is away from the user, and wherein the probable status is selected if the assigned confidence factor satisfies the confidence threshold value, and wherein another probable status associated with another confidence factor is selected if the assigned confidence factor fails the confidence threshold value.

3. The apparatus of claim 1, wherein the sensor inputs comprise situational analysis of the user's actions that impact the external conditions and correspondingly change the information relating to the external conditions, wherein the user's actions are observed by the one or more sensors including one or more of a radio, a camera, a microphone, a motion sensor, an orientation sensor, a light sensor, and a temperature sensor,
wherein the external priorities are pre-coded into the incoming communication prior to being communicated to the user if a sender is aware of a priority scheme, wherein the external priorities are assigned based on one or more factors including one or more keywords contained within the incoming communication,
wherein the probable status is determined based on a combination of possibility analysis and probability analysis using one or more factors including user activity history, and
wherein a notice comprises a communication that the incoming communication is not to be accepted in its present format and that a different format would be accepted, wherein the format is to comprise at least one technique selected from a list consisting of:
a) interactive text;
b) non-interactive text;
c) interactive voice;
d) non-interactive voice; and
e) graphics.

4. A method comprising:
receiving an incoming communication through a radio of a handheld communications device;
monitoring context awareness and situation awareness relating to a user of the device, wherein the situation awareness pertains to conditions external to the electronic device as determined from sensor inputs provided by one or more sensors of the electronic device, wherein the sensor inputs are based on information relating to the external conditions gathered by the one or more sensors;
automatically selecting, based on at least one of the context awareness and the situation awareness, a format in which to present the communication to the user of the device, wherein the context awareness is based on user contexts including the user's preferences, the user's historical activities, the user's current activities, and the user's speculative activities, wherein the activities include one or more of actions, reactions, and decisions associated with the user, wherein automatic selection is performed based on at least one of
external priorities being assigned to the incoming communication without regard for the status awareness of the user,
internal priorities based on the status awareness at a time when the communication is received, and
probable status of the user based on a confidence factor assigned to the probable status and as compared to a confidence threshold value; and
presenting the communication to the user in the selected format.

5. The method of claim 4, wherein the sensor inputs comprise situational analysis of the user's actions that impact the external conditions and correspondingly change the information relating to the external conditions, wherein the user's actions are observed by the one or more sensors including one or more of a radio, a camera, a microphone, a motion sensor, an orientation sensor, a light sensor, and a temperature sensor, wherein the external priorities are pre-coded into the incoming communication prior to being communicated to the user if a sender is aware of a priority scheme, wherein the external priorities are assigned based on one or more factors including one or more keywords contained within the incoming communication, wherein the probable status is determined based on a combination of possibility analysis and probability analysis using one or more factors including user activity history, and wherein a notice comprises a communication that the incoming communication is to be communicated in a different format, wherein the format comprises at least one technique selected from a list consisting of:
a) interactive text;
b) non-interactive text;
c) interactive voice;
d) non-interactive voice; and
e) graphics.

6. The method of claim 4, wherein the internal priorities are determined based on the combination of the one or more context factors and the one or more situation factors, wherein the combination includes at least one of, the user's location at a particular time of day, the particular time of day, the user's activities, background sounds, and movement of the device or its proximity to the user when the device is with the user or when the device is away from the user, and wherein the probable status is selected if the assigned confidence factor satisfies the confidence threshold value, and wherein another probable status associated with another confidence factor is selected if the assigned confidence factor fails the confidence threshold value.

7. A non-transitory computer-readable storage medium that contains instructions, which when executed by one or more processors result in a device performing operations comprising:

receiving an incoming communication through a radio of a handheld communications device;

monitoring context awareness and situation awareness relating to a user of the device, wherein the situation awareness pertains to conditions external to the electronic device as determined from sensor inputs provided by one or more sensors of the electronic device, wherein the sensor inputs are based on information relating to the external conditions gathered by the one or more sensors;

automatically selecting, based on at least one of the context awareness and the situation awareness, a format in which to present the communication to the user of the device, wherein the context awareness is based on user contexts including the user's preferences, the user's historical activities, the user's current activities, and the user's speculative activities, wherein the activities include one or more of actions, reactions, and decisions associated with the user, wherein automatic selection is performed based on at least one of external priorities being assigned to the incoming communication without regard for the status awareness of the user, internal priorities based on the status awareness at a time when the communication is received, and probable status of the user based on a confidence factor assigned to the probable status and as compared to a confidence threshold value; and presenting the communication to the user in the selected format.

8. The apparatus of claim 1, wherein the one or more factors relating to the external priorities further include one or more of a sender's relationship to the user, a recent history of communications from the sender, and a length of the incoming communication, wherein automatic selection includes deciding, based on the status awareness, on performing one or more of alerting the user immediately or a later point in time, converting the incoming communication from one format to another format, transmitting back to a sender of the incoming communication a notice relating to the incoming communication.

9. The apparatus of claim 1, wherein the format includes alerting techniques that are dynamically modified in accordance with perceived changes in the status awareness, wherein dynamic modification includes switching between two or more alerting techniques or altering a current alerting technique, wherein the alerting techniques include one or more of an audible alert, a spoken alert, a vibrate alert, a light alert, a visual alert including a video alert, and an alert via another device.

10. The apparatus of claim 9, wherein altering the current alerting technique comprises making the current alerting technique more noticeable including one or more of increased sound volume, increased frequency of sound, increased urgency in a spoken voice or ringing sound, brighter display, changing color of light, and rapid occurrence of flashing light or periodic sound.

11. The apparatus of claim 9, wherein the alert via another device comprises switching one or more alerts to a secondary device based on changes in the status awareness suggesting the device is unavailable or occupied, wherein the device is regarded as unavailable if the status awareness suggests that the user away from the device or the device is turned off, and wherein the device is regarded as occupied if the device is being used, wherein the perceived changes in the status awareness that trigger modification in alerting techniques include one or more of device location, ambient noise levels, time of day, user presence, device activity, and calendared priorities.

12. The method of claim 4, wherein the one or more factors relating to the external priorities further include one or more of a sender's relationship to the user, a recent history of communications from the sender, and a length of the incoming communication, wherein automatic selection includes deciding, based on the status awareness, on performing one or more of alerting the user immediately or a later point in time, converting the incoming communication from one format to another format, transmitting back to a sender of the incoming communication a notice relating to the incoming communication.

13. The method of claim 4, wherein the format includes alerting techniques that are dynamically modified in accordance with perceived changes in the status awareness, wherein dynamic modification includes switching between two or more alerting techniques or altering a current alerting technique, wherein the alerting techniques include one or more of an audible alert, a spoken alert, a vibrate alert, a light alert, a visual alert including a video alert, and an alert via another device.

14. The method of claim 13, wherein altering the current alerting technique comprises making the current alerting technique more noticeable including one or more of increased sound volume, increased frequency of sound, increased urgency in a spoken voice or ringing sound, brighter display, changing color of light, and rapid occurrence of flashing light or periodic sound.

15. The method of claim 13, wherein the alert via another device comprises switching one or more alerts to a secondary device based on changes in the status awareness suggesting the device is unavailable or occupied, wherein the device is regarded as unavailable if the status awareness suggests that the user away from the device or the device is turned off, and wherein the device is regarded as occupied if the device is being used, wherein the perceived changes in the status awareness that trigger modification in alerting techniques include one or more of device location, ambient noise levels, time of day, user presence, device activity, and calendared priorities.

16. The non-transitory computer-readable storage medium of claim 7, wherein the internal priorities are determined based on the combination of the one or more context factors and the one or more situation factors, wherein the combination includes at least one of the user's location at a particular time of day, the particular time of day, the user's activities, background sounds, and movement of the device or its proximity to the user when the device is with the user or when the device is away from the user, and wherein the probable status is selected if the assigned confidence factor satisfies the confidence threshold value, and wherein another probable status associated with another confidence factor is selected if the assigned confidence factor fails the confidence threshold value.

17. The non-transitory computer-readable storage medium of claim 7, wherein the sensor inputs comprise situational analysis of the user's actions that impact the external conditions and correspondingly change the information relating to the external conditions, wherein the user's actions are observed by the one or more sensors including one or more of a radio, a camera, a microphone, a motion sensor, an orientation sensor, a light sensor, and a temperature sensor, wherein the external priorities are pre-coded into the incoming communication prior to being communicated to the user if a sender is aware of a priority scheme, wherein the external priorities are assigned based on one or more factors including one or more keywords contained within the incoming communication, wherein the probable status is determined based on a combination of possibility analysis and probability analysis using one or more factors including user activity history, and wherein the one or more factors relating to the external priorities further include one or more of a sender's relationship to the user, a recent history of communications from the sender, and a length of the incoming communication, wherein automatic selection includes deciding, based on the status awareness, on performing one or more of alerting the user immediately or a later point in time, converting the incoming communication from one format to another format, transmitting back to a sender of the incoming communication a notice relating to the incoming communication.

18. The non-transitory computer-readable storage medium of claim 7, wherein the format includes alerting techniques that are dynamically modified in accordance with perceived changes in the status awareness, wherein dynamic modification includes switching between two or more alerting techniques or altering a current alerting technique, wherein the alerting techniques include one or more of an audible alert, a spoken alert, a vibrate alert, a light alert, a visual alert including a video alert, and an alert via another device.

19. The non-transitory computer-readable storage medium of claim 18, wherein altering the current alerting technique comprises making the current alerting technique more noticeable including one or more of increased sound volume, increased frequency of sound, increased urgency in a spoken voice or ringing sound, brighter display, changing color of light, and rapid occurrence of flashing light or periodic sound.

20. The non-transitory computer-readable storage medium of claim 18, wherein the alert via another device comprises switching one or more alerts to a secondary device based on changes in the status awareness suggesting the device is unavailable or occupied, wherein the device is regarded as unavailable if the status awareness suggests that the user away from the device or the device is turned off, and wherein the device is regarded as occupied if the device is being used, wherein the perceived changes in the status awareness that trigger modification in alerting techniques include one or more of device location, ambient noise levels, time of day, user presence, device activity, and calendared priorities.

* * * * *